United States Patent
Baqersad (10) Patent No.: US 11,410,324 B2
(45) Date of Patent: Aug. 9, 2022

(54) SYSTEM AND METHOD FOR DETERMINING OPERATING DEFLECTION SHAPES OF A STRUCTURE USING OPTICAL TECHNIQUES

(71) Applicant: Kettering University, Flint, MI (US)

(72) Inventor: Javad Baqersad, Flint, MI (US)

(73) Assignee: KETTERING UNIVERSITY, Flint, MI (US)

( * ) Notice: Subject to any disclaimer, the term of this patent is extended or adjusted under 35 U.S.C. 154(b) by 135 days.

(21) Appl. No.: 16/426,218

(22) Filed: May 30, 2019

(65) Prior Publication Data

US 2019/0385326 A1    Dec. 19, 2019

Related U.S. Application Data

(60) Provisional application No. 62/686,941, filed on Jun. 19, 2018.

(51) Int. Cl.
*G06T 7/593* (2017.01)
*H04N 13/243* (2018.01)
(Continued)

(52) U.S. Cl.
CPC ............ *G06T 7/596* (2017.01); *G01B 11/245* (2013.01); *G06T 3/4038* (2013.01); *H04N 13/243* (2018.05); *G06T 2207/20056* (2013.01)

(58) Field of Classification Search
CPC ........... G06T 7/596; G06T 2207/20056; G06T 3/4038; H04N 13/243; G01B 11/245
See application file for complete search history.

(56) References Cited

U.S. PATENT DOCUMENTS

| 9,262,840 B2 | 2/2016 | Schreier |
| 9,852,330 B1 | 12/2017 | Shannon |

(Continued)

OTHER PUBLICATIONS

Javh, Jaka, Janko Slavič, and Miha Boltežar. "Measuring full-field displacement spectral components using photographs taken with a DSLR camera via an analogue Fourier integral." Mechanical Systems and Signal Processing 100 (2018): 17-27. Published Feb. 2018.

(Continued)

*Primary Examiner* — Kevin Ky
(74) *Attorney, Agent, or Firm* — Dickinson Wright PLLC (57) ABSTRACT

A system for measuring total operating deflection shapes of a structure includes one or more imagers, each including two cameras spaced apart from one another and each oriented and positioned to have corresponding fields of view of a different corresponding section of the structure, with the corresponding sections that may include overlap area of the structure within each of the different sections of the structure. Each of the cameras generates a corresponding data stream, which is communicated to a controller, which is configured to measure the response of the structure to an excitation, such as a vibration or an impulse. The system is configured to convert time-domain data from each of the data streams to the frequency-domain data using a Fourier Transform algorithm and stitching the shapes to obtain the total operating deflection shapes of the structure by scaling and stitching together the frequency-domain data.

21 Claims, 4 Drawing Sheets

(51) Int. Cl.
*G01B 11/245* (2006.01)
*G06T 3/40* (2006.01)

(56) References Cited

U.S. PATENT DOCUMENTS

| | | | | |
|---|---|---|---|---|
| 2010/0224792 | A1* | 9/2010 | Zhang | H01J 37/261 250/442.11 |
| 2012/0267986 | A1* | 10/2012 | Galluzzo | B06B 1/0603 310/348 |
| 2013/0329953 | A1* | 12/2013 | Schreier | G06T 7/579 382/103 |
| 2017/0146787 | A1* | 5/2017 | Reed | H01J 37/265 |
| 2017/0205886 | A1* | 7/2017 | Wan | G02B 27/0172 |

OTHER PUBLICATIONS

Leblanc, Bruce, et al. "Damage detection and full surface characterization of a wind turbine blade using three-dimensional digital image correlation." Structural Health Monitoring 12.5-6 (2013): 430-439. Published Dec. 2013.

Levin, Anat, et al. "Seamless image stitching in the gradient domain." European Conference on Computer Vision. Springer, Berlin, Heidelberg, 2004. Published May 2004.

Li, Junrui, et al. "Whole-field thickness strain measurement using multiple camera digital image correlation system." Optics and Lasers in Engineering 90 (2017): 19-25. Published Mar. 2017.

Patil, Kiran, Vanshaj Srivastava, and Javad Baqersad. "A multi-view optical technique to obtain mode shapes of structures." Measurement 122 (2018): 358-367. Published Jul. 2018.

Poozesh, Peyman, et al. "Large-area photogrammetry based testing of wind turbine blades." Mechanical Systems and Signal Processing 86 (2017): 98-115. Published Mar. 2017.

Pravenaa, S., and R. Menaka. "A methodical review on image stitching and video stitching techniques." International Journal of Applied Engineering Research 11.5 (2016): 3442-3448. Published Mar. 2016.

Wang, Yueqi, et al. "Application of a multi-camera stereo dic set-up to assess strain fields in an erichsen test: methodology and validation." Strain 49.2 (2013): 190-198. Published Feb. 2013.

\* cited by examiner

SYSTEM AND METHOD FOR DETERMINING OPERATING DEFLECTION SHAPES OF A STRUCTURE USING OPTICAL TECHNIQUES

CROSS-REFERENCE TO RELATED APPLICATIONS

This application claims the benefit of U.S. Provisional Application No. 62/686,941 filed Jun. 19, 2018, the entire disclosure of which is incorporated herein by reference.

FIELD

The present disclosure relates generally to optical measurement to determine vibration characteristics of a structure in the form of operating deflection shapes and mode shapes.

BACKGROUND

Vibration characteristics of a structure are conventionally obtained by exciting the structure using an impact hammer or a mechanical shaker and measuring the response using accelerometers. However, using accelerometers for vibration measurement may induce mass loading effects and does not provide the full-field response of the structure. Also, sometimes it is challenging to excite measurement points in all the three x, y and z directions using an impact hammer and obtaining 3D mode shapes becomes nearly impossible. Digital Image Correlation (DIC) and other optical techniques have provided a solution to these problems because they provide the full-field response of the structure, are non-contacting, and do not induce mass loading effects. However, the DIC technique (similar to other optical methods) is limited by the field of view of the cameras and can only measure the response on the parts of the structure that cameras have a line of sight. Thus, this technique has not traditionally been used to obtain the mode shapes and operating deflection shapes of large and complex structures.

As described in LeBlanc et al., *Damage detection and full surface characterization of a wind turbine blade using three-dimensional digital image correlation*, Structural Health Monitoring (2013), images of overlapping portions of a structure may be combined for digital image correlation (DIC). For example, a single stereo camera may be moved around the structure. Measured deformations are then stitched together to obtain the deformations of the entire structure. This technique is similar to known stitching techniques used for creating panoramic photographs from multiple smaller images. However, this technique cannot be applied for a dynamic measurement because the response is transient, and the deformation of the structure may change when the camera system moves (unless for a steady state phenomenon). This occurs because the input force may vary during each measurement. Thus, deformations in each view are from a different state of the structure (e.g., when the first view is recorded, the first and second vibration modes of the structure are excited while the second view is recorded when the third and fourth modes are dominant).

As described in P. Poozesh, et al., *Large-area photogrammetry based testing of wind turbine blades*, Mech. Syst. Signal Process. (2016), multiple cameras may be used in a system to measure the entire shape of an object and to obtain operating deflection shapes of a structure.

SUMMARY

A system for measuring a total operating deflection shape of a structure is provided. The system includes a first imager including one or more cameras. Each of the cameras of the first imager has a corresponding field of view of a first section of the structure, and each of the cameras of the first imager generates a corresponding first data stream including first time-domain data. The system also includes a second imager including one or more cameras. In some embodiments, the second imager can be the first imager moved to capture another section of structure. Each of the cameras of the second imager has a corresponding field of view of a second section of the structure, and each of the cameras of the second imager generates a corresponding second data stream including second time-domain data. Each of the first section and the second section includes an overlap area of the structure. The system also includes a controller in communication with each of the cameras and configured to measure a response of the structure to an excitation by converting the first time-domain data and the second time-domain data to frequency-domain data to obtain the total operating deflection shape of the structure.

A method for measuring a total operating deflection shape of a structure is also provided. The method includes the steps of: exciting the structure by an excitation source; imaging a first section of the structure by one or more cameras of a first imager to generate a first data stream including first time-domain data; imaging a second section of the structure different from and overlapping the first section by one or more cameras of a second imager to generate a second data stream including second time-domain data; converting the first time-domain data from the first imager to the frequency-domain data to obtain a first operating deflection shape of the first section of the structure, and converting the second time-domain data from the second imager to frequency-domain data to obtain a second operating deflection shape of the second section of the structure; and combining the operating deflection shapes for each of the sections of the structure to obtain the total operating deflection shape for an area of the structure larger than either of the first section or the second section.

BRIEF DESCRIPTION OF THE DRAWINGS

Further details, features and advantages of designs of the invention result from the following description of embodiment examples in reference to the associated drawings.

DETAILED DESCRIPTION

Recurring features are marked with identical reference numerals in the figures, in which an example embodiment of a system 20 for measuring a total operating deflection shape 11 of a structure 10 is disclosed. The structure 10 may be a stand-alone object or a component of a larger assembly or apparatus. The present disclosure is particularly useful for measuring the total operating deflection shapes 11 of structures 10 that are configured to move or to be regularly subjected to vibrations, such as a vehicle body component an object that is regularly subjected to moving fluids or other sources of vibratory energy.

A new approach to obtain a uniform scaling factor that enables operating deflection shapes (unsealed mode shapes) to be stitched together from different views of cameras is provided. An operating deflection shape corresponding to a resonant frequency of a structure and shows the deformation that occurs (or a shape that a structure will show) when it is excited at that specific resonant frequency. This shape can be scaled using the exciting force to obtain a mode shape. The technique of the present disclosure enables the operating deflection shapes (or mode shapes) of complex structures to be extracted using only a single imager (e.g. a single stereo camera system). To show the merit of the proposed technique, the operating deflection shapes of an exhaust muffler are extracted using this optical based technique. The muffler is excited with a known or unknown force using an impact hammer. Alternatively or additionally, the excitation can be provided by normal operation of the component. A pair of high-speed cameras is used to measure the response of the structure limited to its field of view. The operating deflection shape of every field of view is then obtained based on a measured response using the digital signal processing theory. Further, the operating deflection shapes of individual fields of view are stitched using a minimum of three reference points in the region common to the adjacent field of view to obtain the operating deflection shapes of the entire structure. In some embodiments, the stitching can be done using a global coordinate system. The subject approach stitches the shapes in the frequency domain rather than the commonly used stitching technique in the time domain. This technique expands the applications of digital image correlation (DIC) and optical techniques in the field of structural dynamics and enables us to extract operating deflection shapes of a complex structure using optical techniques.

Figure 1:
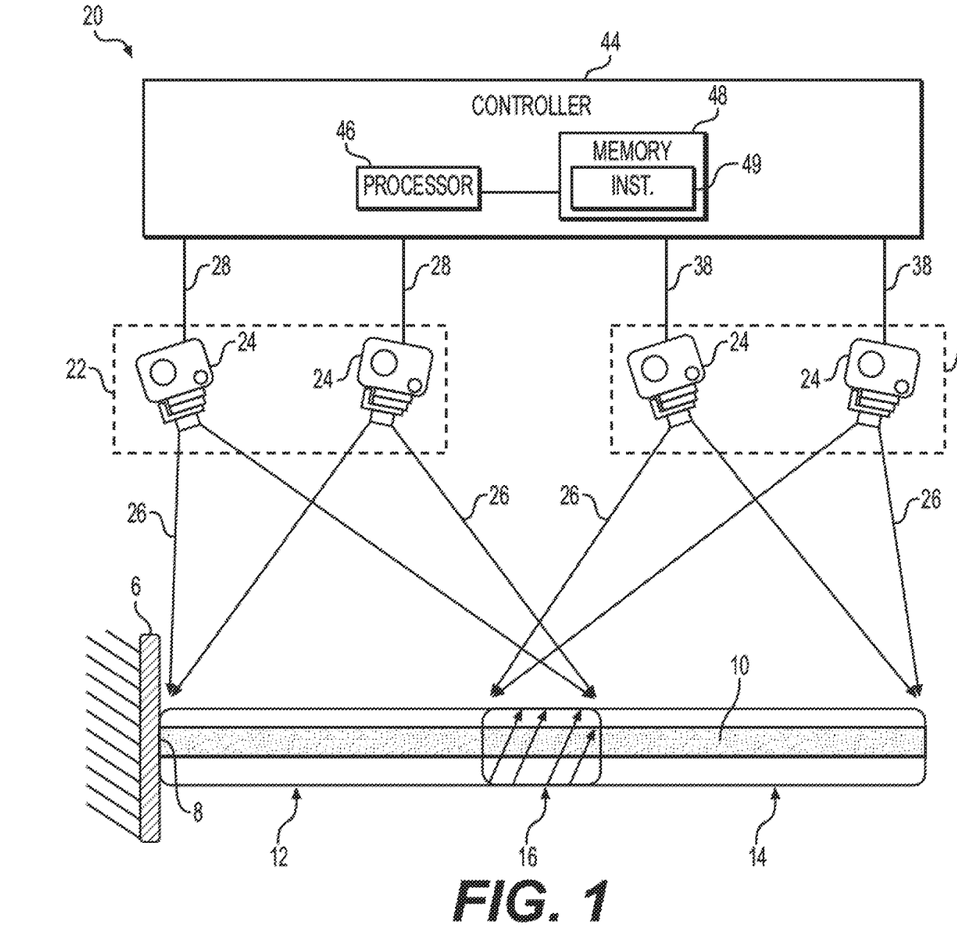
FIG. 1 is a schematic diagram of an example system for measuring operating deflection shapes of a structure using a multi-view technique.

FIG. 1 is a schematic diagram of an example system 20 for measuring operating deflection shapes of a structure 10 in the form of an elongated and cantilevered beam. The structure 10 shown in the example system 20 is attached to a fixed member 6, such as a foundational structure at an attachment point 8. In other embodiments, the structure 10 may be measured while being held loosely or while resting upon a surface. In other embodiments, the structure 10 may be installed as part of a larger assembly, such as where the structure 10 is a part of a machine, such as a vehicle, or as part of a constructed assembly, such as a building, a bridge, a crane, or a windmill. It should be appreciated that these are merely illustrative examples and that the structure 10 may be any physical object or assembly.

In some embodiments, and as shown in FIG. 1, the system 20 includes a first imager 22 having two cameras 24 spaced apart from one another and each oriented to have corresponding fields of view 26 of a first section 12 of the structure 10. The first imager 22 may have one or more independent cameras 24. Each of the cameras 24 of the first imager 22 generates a corresponding first data stream 28. The system 20 also includes a second imager 34 having two cameras 24 spaced apart from one another and each oriented to have corresponding fields of view 26 of a second section 14 of the structure 10 different from the first section 12. Each of the cameras 24 of the second imager 34 generates a corresponding second data stream 38. Each of the two imagers 22, 34 are oriented and positioned to view an overlap area 16 of the structure 10 within each of the first section 12 and the second section 14. In some embodiments, the first and second imagers 22, 34 may be synchronized.

Alternatively, the imagers 22, 34 may be not synchronized to one another and/or to any reference signal.

The system 20 also includes a controller 44 in communication with each of the cameras 24 and configured to measure the response of the structure 10 to an excitation, such as a vibration or an impulse, which may be applied to the structure 10, for example, using an impact hammer or a shaker. The system 20 may also measure vibrations originating in the structure 10 or which are from an unknown source. For example, the system 20 may be used in troubleshooting noise and/or vibration in a structure 10 to determine the source and/or to aid in design changes to mitigate such noise and/or vibration.

The system 20 is configured to convert time-domain data from each of the data streams 28, 38 from the cameras 24 to frequency-domain data. In some embodiments, the controller 44 may use a discrete Fourier transform (DFT) algorithm to convert the time-domain data to the frequency-domain data. In some embodiments, the controller 44 uses a Fast Fourier Transform (FFT) algorithm to convert the time-domain data to frequency-domain data. In some embodiments, the system 20 is also configured to stitch together the frequency-domain data to obtain the total operating deflection shape 11 for an area of the structure 10 larger than either of the first section 12 or the second section 14. In some embodiments, the area of the structure 10 larger than either of the first section 12 or the second section 14 includes the entirety of the structure 10, and thus the total operating deflection shape 11 covers the entire structure 10. In some embodiments, the system is also configured to scale the frequency-domain data associated with one or both of the sections 12, 14 prior to stitching the frequency-domain data to obtain the total operating deflection shape 11. Scaling may be used, for example, to align the overlap areas 16 within each of the sections 12, 14 of the structure 10.

Figure 2:
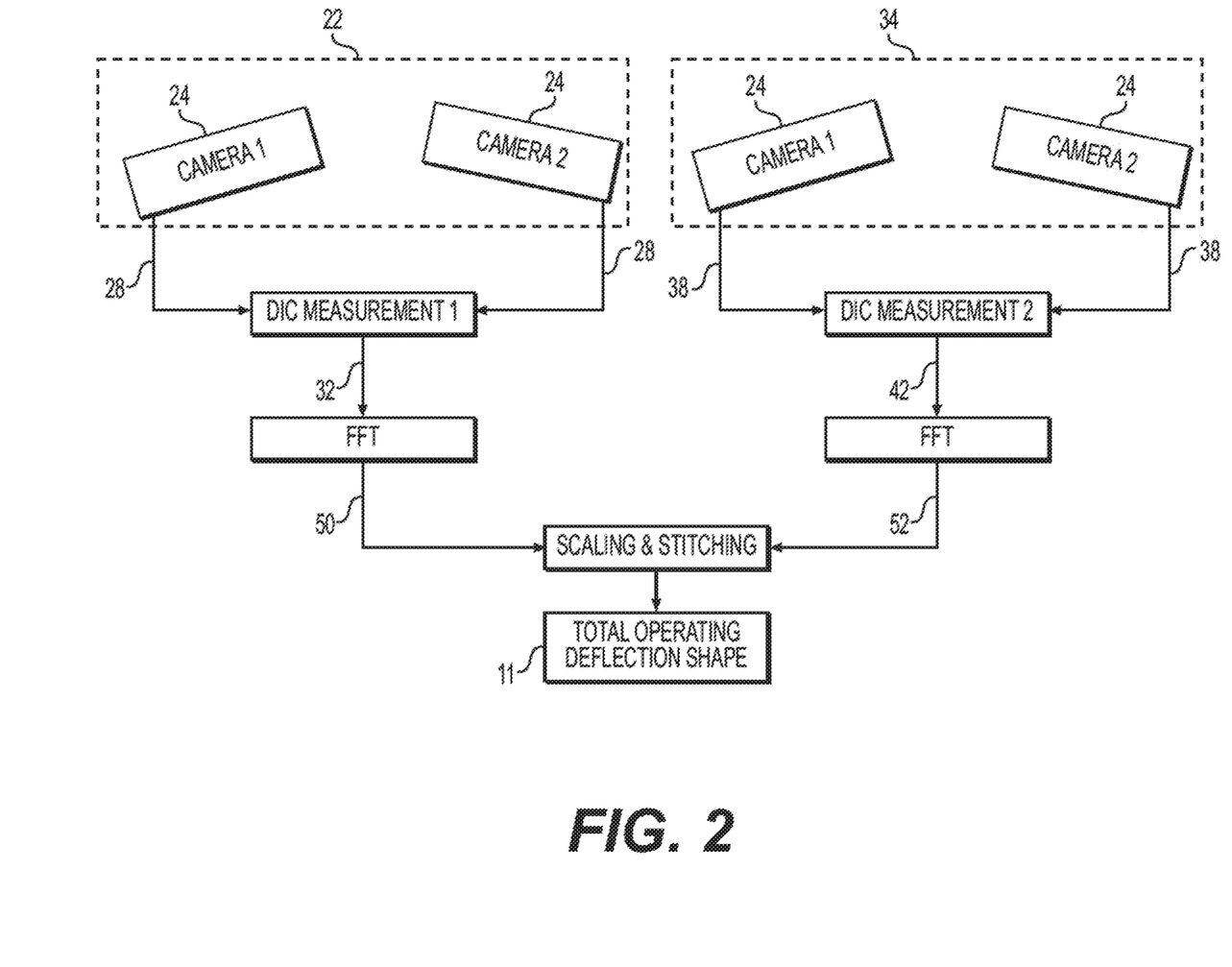
FIG. 2 is a block diagram illustrating an example system and method for measuring total operating deflection shapes of a structure in accordance with the present disclosure.
Figure 3:
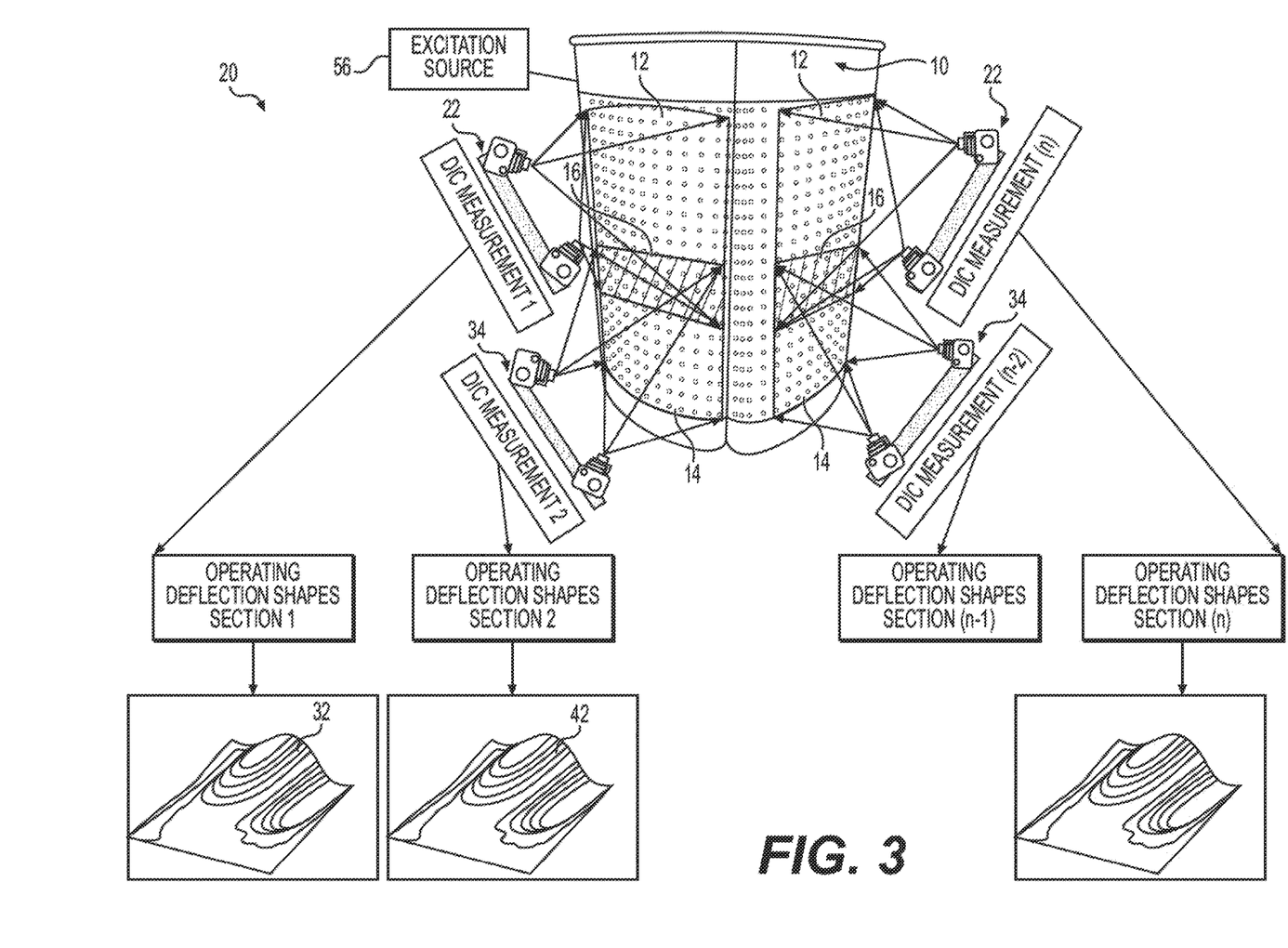
FIG. 3 is a schematic block diagram illustrating an example system and method for measuring operating deflection shapes of a structure.

In the example embodiments shown in FIGS. 1-3, each of the imagers 22, 34 is a stereoscopic device, which includes two or more cameras 24, each spaced apart from one another and positioned to have a corresponding field of view 26 of a same section 12, 14 of the structure 10. Such stereoscopic imagers 22, 34 can, therefore, measure the 3-dimensional shape of the structure 10 as well as the displacement of the corresponding section 12, 14 of the structure 10 in 3-dimensions. However, the system 20 may include one camera 24 in each of the imagers 22, 34, which would measure only 2-dimensional (or 3-dimensional) displacement, and could therefore obtain 2-dimensional operating deflection shapes. The imagers 22, 34 could also include three or more cameras. Combining the 2-dimensional images from the two or more cameras 24 into a stereoscopic image could be performed by the imagers 22, 34 themselves. Alternatively, the controller 44 could combine 2-dimensional images from each of the two or more cameras in each of the imagers 22, 34 to generate the stereoscopic image and data regarding the displacement of the structure 10 in 3-dimensions.

In some embodiments, and as shown in FIG. 1, the controller 44 includes a processor 46 and a machine readable storage medium 48, such as a non-transitory memory, storing a program in the form of a series of instructions 49 for execution by the processor 46. In some embodiments, the instructions 49 may be executed by the processor 46 to cause the processor 46 to convert the first and second time-domain data from each of the data streams 28, 38 to frequency-domain data and to obtain the total operating deflection shapes 11 of the structure 10. The processor 46 may include one or more microprocessors, microcontrollers, field programmable gate arrays (FPGAs) and/or special purpose hardware, such as an application specific integrated circuit (ASIC). The machine readable storage medium 48 may include one or more different types of storage media such as, for example, magnetic media, optical storage media, EEPROM, FLASH memory, DRAM, SRAM, cache memory, etc. The Fast Fourier Transform (FFT), the scaling, and/or the stitching functions may be performed by one or more software modules within the series of instructions 49. Some or all of the functions performed by the system 20 to obtain the total operating deflection shapes 11 of the structure 10 may be performed on hardware and/or software that is located in or remotely from the controller 44, for example, in a remote server.

FIG. 3 is a schematic block diagram illustrating an example system 20 and method for measuring operating deflection shapes of a structure 10. The system 20 may include any number (n) of the imagers 22, 34, where n is a number of 1 or more. As illustrated in the example of FIG. 3, in which the structure 10 is a muffler for a vehicle, each of the imagers 22, 34 measures a corresponding deformation profile 32, 42 for a corresponding section 12, 14 of the structure 10. By using several different imagers 22, 34, the total operating deflection shapes 11 of a structure 10 that is very large and/or complex may be determined. Each of the imagers 22, 34 includes one or more cameras 24.

In some embodiments, the imagers 22, 34 could be a single device that is moved with respect to the structure 10, and which successively images the different sections 12, 14 of the structure 10 at different times to capture different views of the structure 10. The imager 22, 34 could be stationary while the structure 10 is moved or the structure 10 could be stationary while the imager 22, 34 is moved. Alternatively, both the structure 10 and the imager 22, 34 may be moved relative to one-another. In some embodiments, and as shown in FIGS. 1-2, each of the first imager 22 and the second imager 34 may be separate and independent from one another, with the first imager 22 and the second imager 22 each configured to simultaneously generate a corresponding one of the data streams 28, 38 representing the corresponding one of the first section 12 and the second section 14 of the structure 10.

Figure 4:
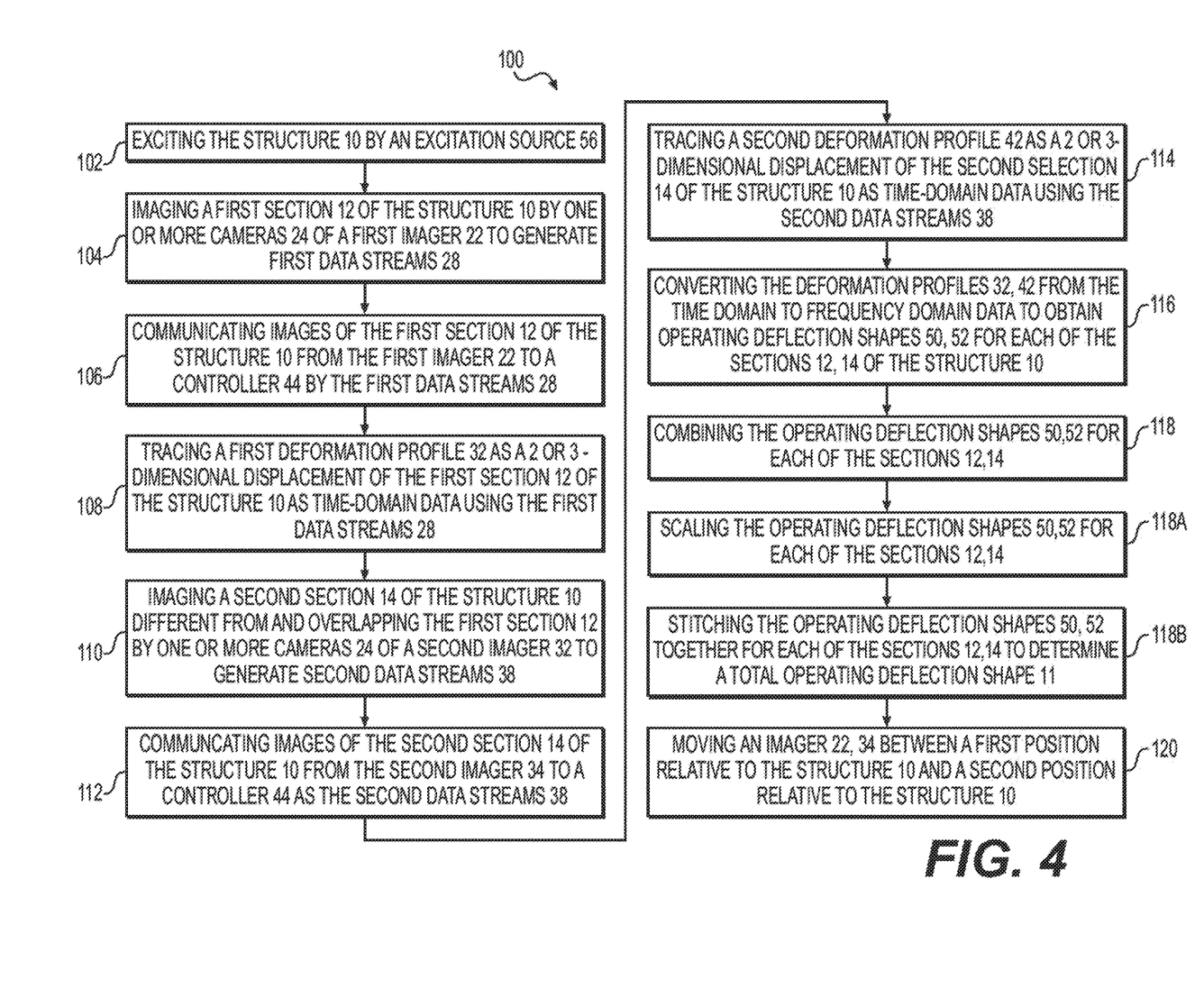
FIG. 4 is a flow chart of steps in an example method for measuring a total operating deflection shape of a structure.

As described in the flow chart of FIG. 4, a method 100 for measuring total operating deflection shapes 11 of a structure 10 is also provided. The method 100 includes exciting the structure 10 by an excitation source 56 at step 102. This step 102 may include hitting the structure 10 at a predetermined position with an impact source, such as an impact hammer. Alternatively or additionally, this step 102 may include vibrating the structure 10 using a vibration source. This step 102 may include using a vibration source separate from the structure 10 or a vibration source in contact with the structure 10, such as by activating a mechanized shaker device in physical contact with the structure 10. In some embodiments, this step 102 may include inducing mechanical excitation such as vibration by the operation of the structure 10. For example, this may include passing actual or simulated exhaust gasses through a structure 10 that is a vehicle muffler. This step may be performed by an unknown or unintentional excitation source 56, such as in cases where a structure 10 is observed to be vibrating due to an unknown cause.

The method 100 also includes imaging a first section 12 of the structure 10 by one or more cameras 24 of a first imager 22 to generate one or more first data streams 28 at step 104. In an example embodiment, step 104 includes imaging the first section 12 by a stereoscopic pair of cameras 24 that are spaced-apart from one another by a predetermined distance. The first data streams 28 may include, for example, a high speed video signal from each of the cameras 24 in the first imager 22, and which may take the form of a digital or analog signal.

The method 100 also includes communicating images of the first section 12 of the structure 10 from the first imager 22 to a controller 44 as the first data streams 28 at step 106. The first data streams 28 may be communicated via wired or wireless channels, and may be accomplished via electrical or optical signals. The first data streams 28 may be communicated in real-time or with some delay due, e.g. due to processing and/or bandwidth limitations. Alternatively, the controller 44 may be integrated with the first imager 22 and may obtain data directly therefrom.

The method 100 also includes tracing a first deformation profile 32 as a 2 or 3-dimensional displacement of the first section 12 of the structure 10 as time-domain data using the first data streams 28 from the first imager 22 and in response to the exciting of the structure 10 by the vibration source at step 108. In the example embodiment, the first imager 22 is a stereoscopic device including two or more cameras 24, the first deformation profile 32 includes the 3-dimensional displacement. This step 108 may be performed using a photogrammetry technique such as digital image correlation (DIC), and corresponds to the box labeled "DIC measurement 1" on FIG. 2.

The method 100 also includes imaging a second section 14 of the structure 10 different from and overlapping the first section 12 by one or more cameras 24 of a second imager 34 to generate a second data stream 38 at step 110. In an example embodiment, step 110 includes imaging the second section 14 by a stereoscopic pair of cameras 24 that are spaced-apart from one another by a predetermined distance. The second imager 34 may be an independent device from the first imager 22. Alternatively, the second imager 34 may be the same device as the first imager 22, which is moved relative to the structure 10 in order to image the different sections 12, 14. The second data streams 38 may be, for example, high speed video signal from each of the cameras 24 in the second imager 34, and which may take the form of a digital or analog signal.

The method 100 also includes communicating images of the second section 14 of the structure 10 from the second imager 34 to a controller 44 as the second data streams 38 at step 112. The second data streams 38 may be communicated via wired or wireless channels, and may be accomplished via electrical or optical signals. The second data streams 38 may be communicated in real-time or with some delay due, e.g. due to processing and/or bandwidth limitations. Alternatively, the controller 44 may be integrated with the second imager 34 and may obtain data directly therefrom.

The method 100 also includes tracing a second deformation profile 42 as a 2 or 3-dimensional displacement of the second section 14 of the structure 10 as time-domain data using the second data streams 38 from the second imager 34 in response to the exciting of the structure 10 by the vibration source at step 114. In the example embodiment, the second imager 34 is a stereoscopic device including two or more cameras 24, the second deformation profile 42 includes the 3-dimensional displacement. This step 114 may also be called digital image correlation (DIC), and corresponds to the box labeled "DIC measurement 2" on FIG. 2.

The method 100 also includes converting the deformation profiles 32, 42 from time-domain data to frequency-domain data to obtain operating deflection shapes 50, 52 for each of the sections 12, 14 of the structure 10 at step 116. In some embodiments, this step 116 includes using a Fast Fourier Transform (FFT) algorithm. This step 116 corresponds to the boxes labeled "FFT" on FIG. 2.

The method 100 also includes combining the operating deflection shapes 50, 52 together for each of the sections 12, 14 to determine a total operating deflection shape 11 for a larger area including each of the sections 12, 14 at step 118. In some cases, the larger area may be the entire structure 10.

In some embodiments, the step 118 of combining the operating deflection shapes 50, 52 together for each of the sections 12, 14 may include scaling the operating deflection shapes 50, 52 for each of the sections 12, 14 at sub-step 118A. This sub-step 118A may include increasing or decreasing one or more components of one of the operating deflection shapes 50, 52 in order to match the value or values of associated components of the other one of the operating deflection shapes 50, 52 in the overlapping area 16.

In some embodiments, the step 118 of combining the operating deflection shapes 50, 52 together for each of the sections 12, 14 may include stitching together the operating deflection shapes 50, 52 for each of the sections 12, 14 at sub-step 118B. This sub-step 118B may include associating three or more reference points in the overlapping area 16 that is common to each of the sections 12, 14. The method 100 may therefore allow for the total operating deflection shape 11 of the entire structure 10 to be determined. The stitching can also be performed using a global coordinate system that is used for each section.

The method 100 also includes moving an imager 22, 34 between a first position and a second position at step 120, where the second position is spaced apart from the first position relative to the structure 10. The imager 22, 34 may, therefore image (i.e. capture a series of images of) the first section 12 of the structure 10 from the first position, and subsequently image (i.e. capture a series of images of) the second section 14 of the structure 10 from the second position. For example, the imager 22, 34 could be stationary while the structure 10 is moved or the structure 10 could be stationary while the imager 22, 34 is moved. Alternatively, both the structure 10 and the imager 22, 34 may be moved relative to one-another.

In some embodiments, the method 100 may include including measuring a plurality of different total operating deflection shapes 11 of the structure 10, with each of the different total operating deflection shapes 11 corresponding to a different excitation of the structure 10. For example, the different excitations of the structure 10 may include exciting the structure 10 at different frequencies, and/or at different locations.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for measuring a total operating deflection shape of a structure, comprising:
    a first imager including one or more cameras each having a corresponding field of view of a first section of the structure and each generating a corresponding first data stream including first time-domain data;
    a second imager including one or more cameras each having a corresponding field of view of a second section of the structure and each generating a corresponding second data stream including second time-domain data; and
    a controller in communication with each of the cameras and configured to measure a response of the structure to an excitation of the structure at a plurality of different frequencies by converting the first time-domain data and the second time-domain data to frequency-domain data to obtain an operating deflection shape for each of the sections of the structure within the fields of view of each of the first imager and the second imager, and then to stitch together the operating deflection shapes for each of the sections of the structure to obtain the total operating deflection shape of the entire structure,
    wherein the total operating deflection shape corresponds to a resonant frequency of the structure and shows a deformation that the structure will exhibit when the structure is excited at the resonant frequency.

2. The system as set forth in claim 1, wherein each of the first section and the second section includes an overlap area of the structure.

3. The system as set forth in claim 1, wherein the controller includes a processor and a machine readable storage medium holding instructions for execution by the processor to cause the processor to convert the first time-domain data and the second time-domain data to frequency-domain data to obtain the total operating deflection shape of the structure.

4. The system as set forth in claim 1, wherein the controller is configured to convert the first time-domain data and the second time-domain data to frequency-domain data using a Fast Fourier transform (FFT).

5. The system as set forth in claim 1, wherein the first imager and the second imager are a single device moved between two different positions relative to the structure.

6. The system as set forth in claim 1, wherein the first imager and the second imager are separate and independent from one another; and
wherein the first imager and the second imager are each configured to simultaneously generate a corresponding one of the data streams representing the corresponding one of the first section and the second section of the structure.

7. The system as set forth in claim 1, wherein the one or more cameras of the first imager includes two cameras spaced apart from one another; and
wherein the one or more cameras of the second imager includes two cameras spaced apart from one another.

8. The system as set forth in claim 7, wherein at least one of the first imager or the second imager is a stereoscopic device, and wherein the system is configured to measure a 3-dimensional shape of the structure.

9. A method for measuring a total operating deflection shape of a structure comprising:
exciting the structure at a plurality of different frequencies by an excitation source;
imaging a first section of the structure to generate a first data stream including first time-domain data;
imaging a second section of the structure different from and overlapping the first section to generate a second data stream including second time-domain data;
converting the first time-domain data from the first imager to frequency-domain data to obtain a first operating deflection shape of the first section of the structure, and converting the second time-domain data from the second imager to frequency-domain data to obtain a second operating deflection shape of the second section of the structure; and
combining the operating deflection shapes for each of the sections of the structure to obtain the total operating deflection shape for an area of the structure larger than either of the first section or the second section,
wherein the total operating deflection shape corresponds to a resonant frequency of the structure and shows a deformation that the structure will exhibit when the structure is excited at the resonant frequency.

10. The method of claim 9, wherein converting the first time-domain data from the first imager and the second time-domain data from the second imager to frequency-domain data is done using a Fast Fourier Transform (FFT) algorithm.

11. The method of claim 9, wherein the area of the structure larger than either of the first section or the second section is the entire structure.

12. The method of claim 9, wherein combining the operating deflection shapes for each of the sections of the structure to obtain the total operating deflection shape for the area of the structure larger than either of the first section or the second section further comprises scaling the operating deflection shapes for each of the sections.

13. The method of claim 9, wherein combining the operating deflection shapes for each of the sections of the structure to obtain the total operating deflection shape for the area of the structure larger than either of the first section or the second section further comprises stitching the operating deflection shapes together for each of the sections.

14. The method of claim 9, wherein the excitation source is an impulse source; and
wherein exciting the structure by the excitation source includes exciting the structure by an impulse excitation.

15. The method of claim 9, wherein the excitation source is a vibration source; and
wherein exciting the structure by the excitation source includes vibrating the structure by the vibration source.

16. The method of claim 9, wherein exciting the structure by the excitation source includes activating a vibration source in contact with the structure.

17. The method of claim 9, wherein the excitation source is unknown in origin.

18. The method of claim 9, further including:
tracing a first deformation profile as a 2-dimensional or 3-dimensional displacement of the first section of the structure as frequency-domain data using the first data streams from the first imager in response to the exciting of the structure by the vibration source; and
tracing a second deformation profile as a 2-dimensional or 3-dimensional displacement of the second section of the structure as frequency-domain data using the second data stream from the second imager in response to the exciting of the structure by the vibration source.

19. The method of claim 9, further including measuring a plurality of different total operating deflection shapes of the structure, with each of the different total operating deflection shapes corresponding to a different excitation of the structure.

20. The method of claim 19, wherein the different excitation of the structure includes exciting the structure at one of a different frequency or at a different location.

21. The method of claim 9, further comprising:
moving an imager between a first position and a second position, with the second position spaced apart from the first position relative to the structure;
wherein the imager images the first section of the structure from the first position; and
wherein the imager images the second section of the structure from the second position.

* * * * *